United States Patent [19]

Porter et al.

[11] Patent Number: 5,106,874

[45] Date of Patent: Apr. 21, 1992

[54] PROCESS FOR PREPARING ELASTOMERIC POLYURETHANE OR POLYURETHANE-UREA POLYMERS, AND POLYURETHANES SO PREPARED

[75] Inventors: James R. Porter; Robert B. Turner, both of Lake Jackson, Tex.

[73] Assignee: The Dow Chemical Company, Midland, Mich.

[21] Appl. No.: 532,427

[22] Filed: Jun. 4, 1990

Related U.S. Application Data

[63] Continuation-in-part of Ser. No. 367,280, Jun. 16, 1989, abandoned.

[51] Int. Cl.$^5$ ..................... C08G 18/32; C07C 127/24
[52] U.S. Cl. ........................ 528/64; 560/335; 264/328.1
[58] Field of Search ............. 521/159; 560/335; 528/64; 264/388.1

[56] References Cited

U.S. PATENT DOCUMENTS

| | | | |
|---|---|---|---|
| 4,595,742 | 6/1986 | Nalepa et al. | 528/64 |
| 4,687,851 | 8/1987 | Laughner | 544/398 |
| 4,816,600 | 3/1989 | Gillis, Jr. | 560/335 |

OTHER PUBLICATIONS

T. H. Austin, "RIM Elastomers from Low Unsaturation Polyols", Abstract of proposed paper of 32nd Annual Polyurethane Conference, Oct. 1–4, 1989, Feb. 22, 1989.

Bylsma et al., "Improvement of Properties of Urethane Elastomers by Removal of Terminal Unsaturation in Poly(oxypropylene)Diols", Ind. Eng. Chem. Prod. Res. Develop, vol. 7, pp. 234–238 (1968).

J. Arceneaux et al., "The Effect of Monohydroxy Polyether Polyols on the Processing. Reactivity, and Physical Properties Performance of Flexible Slabstock Foam System", Journal of Elastomers and Plastics, vol. 14, p. 63 (1982).

*Primary Examiner*—John Kight, III
*Assistant Examiner*—Dvc Truong

[57] ABSTRACT

A process is disclosed for preparing a polyurethane or polyurea elastomer by reacting in a closed mold a reaction mixture comprising a polyisocyanate and a relatively high equivalent weight polyether. The process is characterized by employing as said polyether a polymer or copolymer of propylene oxide having at least two hydroxyl groups per molecule, an equivalent weight from about 1000 to about 5000 and a monofunctional species content of about 0.04 milliequivalents/gram of polymer or less.

26 Claims, No Drawings

PROCESS FOR PREPARING ELASTOMERIC POLYURETHANE OR POLYURETHANE-UREA POLYMERS, AND POLYURETHANES SO PREPARED

CROSS-REFERENCE TO RELATED APPLICATION

This is a continuation-in-part of application Ser. No. No. 367,280, filed June 16, 1989, now abandoned, incorporated herein by reference.

BACKGROUND OF THE INVENTION

This invention relates to a process for preparing polyurethane and/or polyurea elastomers (PUU elastomers), and particularly to a process employing a relatively high equivalent weight polymer of propylene oxide.

Polyurethane and/or polyurea elastomers are commonly prepared by reacting a polyisocyanate with a relatively high equivalent weight "polyol" and a chain extender in a mold. The "polyol" component is typically a material having an equivalent weight in the range from about 800 to about 5,000 which contains 2 or more isocyanate-reactive groups per molecule. One common type of these is a polymer of propylene oxide. These poly(propylene oxide) polymers have found extensive use in preparing various types of polyurethane or polyurea elastomers. Polymers of propylene oxide provide the elastomer with very desirable properties, including flexibility, low temperature performance, toughness and softness. They are also relatively inexpensive and can be prepared having varying functionalities. Accordingly, they are the materials of choice in many elastomer applications.

However, in some instances, it is more difficult than desired to process these polymers into polyurethanes. In order to maximize production from an individual mold, the mold must be used and reused as often as possible per unit of time. Thus, it is desired that the PUU-forming composition react quickly inside the mold so that the elastomer rapidly gains enough physical strength that it can be demolded without becoming permanently distorted.

Previously, there have been attempts to reduce demold times by increasing the reactivity of the reaction mixture. For example, the "polyol" can often be made more reactive by providing terminal primary hydroxyl groups. This is most commonly done by "capping" it with ethylene oxide. However, since not all chain ends are capped, it is usually necessary to use a substantial quantity of ethylene oxide to obtain a high conversion to primary hydroxyl groups. The capped polymer therefore contains a significant proportion of oxyethylene groups, which cause it and the resulting PUU elastomer to be moisture sensitive. In addition, this approach by itself often cannot increase the reactivity of the polyol as much as desired.

Another approach is to increase catalyst level. Although reduced demold times can be obtained in this manner, premature gelation of the reaction mixture and other unwanted side effects often occur. Because of these, the molder often has an extremely short time to transfer the reaction mixture into the mold, which limits the size of the part he can make. These problems are particularly severe in reaction injection molding (RIM) processes, wherein especially highly reactive components are used, and gel times are on the order of seconds.

Thus, it would be desirable to provide for improved processing latitude in the preparation of PUU elastomers using polymers of propylene oxide. It would also be desirable to provide such improved processing latitude while maintaining fast demold times, or even decreasing same.

In addition, it is always desirable to improve the physical properties of PUU elastomers. In making cast elastomers, improvements in tensile and tear strength are desirable. In RIM elastomers, improvement in flexural modulus ratio, heat sag and impact strength are desired. Also, RIM elastomers often exhibit defects called "surface sinks" in which areas of the polymer are slightly depressed relative to the remaining surface. It is desired to decrease the amount of these surface sinks, particularly when a high quality surface is desired, such as for external automobile parts. It would also be desirable to provide an elastomer with improved thermal properties and in some instances improved moisture sensitivity.

SUMMARY OF THE INVENTION

In one aspect, this invention is an improvement in a process for preparing a polyurethane and/or polyurea elastomer in which a polyisocyanate is reacted with an isocyanate-reactive composition including a 1000-5000 equivalent weight material, wherein the major portion of the 1000-5000 equivalent weight material is a poly(propylene oxide) polymer nominally having at least two isocyanate-reactive groups per molecule or mixture thereof, said poly(propylene oxide) polymer or mixture thereof having about 0.04 milliequivalent per gram (meq/g) or less of monofunctional impurities.

In a second aspect, this invention is a process wherein an isocyanate-terminated prepolymer or quasi-prepolymer is reacted with an isocyanate-reactive composition to form a polyurethane and/or polyurea elastomer, wherein (1) said prepolymer or quasi-prepolymer is the reaction product on an excess of a polyisocyanate and a composition containing a 1000-5000 equivalent weight isocyanate-reactive material or mixture thereof, wherein the major portion of said 1000-5000 equivalent weight isocyanate-reactive material is a poly(propylene oxide) polymer nominally having at least two isocyanate-reactive groups per molecule or mixture thereof, said poly(propylene oxide) polymer or mixture thereof having about 0.04 meq/g or less of monofunctional impurities; and (2) said poly(propylene oxide) polymer or mixture thereof constitutes at least about 15 percent of the combined weight of all 1000-5000 equivalent weight isocyanate-reactive materials employed in preparing said prepolymer or quasi-prepolymer and in the isocyanate-reactive composition with which said prepolymer or quasi-prepolymer is reacted.

It has surprisingly been found that the use of a poly(propylene oxide) polymer having a low monofunctional species content provides for rapid demolding, yet provides a processing window which is broader than that provided by conventional poly(propylene oxide) polymers. Accordingly, this invention provides improved "green strength" to the molded polymers, thereby facilitating their early removal from the mold. Moreover, reaction mixtures containing the low monofunctional species polyether of this invention react slowly enough that the mixture can be formed and transferred into the mold without significant premature gelation. Thus, this invention retains the processing latitude characteristics of conventional reaction mixtures which use polyethers having high contents of monofunctional species. In addition, it is possible to reduce mold temperatures at an equivalent demold time with this invention, thereby saving on energy expenses as well as reducing the risk of burns by the mold operators. It is further possible with this invention to obtain good demold times using poly(propylene oxide) polymers having reduced oxyethylene contents. This has the further advantage of reducing the moisture sensitivity of the PUU elastomer.

"Low monol content" or "low monofunctional species content" are terms used herein to indicate a monofunctional species content of 0.04 meq/g or less.

In the second aspects, similar improvements are seen. This is particularly surprising in view of the fact that in many instances, the poly(propylene oxide) polymer used in making the prepolymer is only a relatively small portion of the high equivalent weight materials used in the overall process.

This invention is applicable to various types of elastomeric polyurethanes, including thermosetting as well as thermoplastic polyurethanes, cast elastomers as well as RIM-processed elastomers.

The PUU elastomers of this invention also often exhibit improved physical and thermal properties. In addition, RIM-processed elastomers have improved surface qualities, due to the substantially reduced number of surface sinks.

DETAILED DESCRIPTION OF THE INVENTION

The preparation of the elastomer of this invention is characterized by using, in either the A-side or B-side or both, an isocyanate-reactive poly(propylene oxide) polymer having a low monofunctional species content. Poly(propylene oxide) polymers are advantageously prepared by the catalyzed, thermally induced polymerization of propylene oxide (PO) in the presence of an initiator compound as described below. Under the conditions of its polymerization, PO undergoes an isomerization reaction to form allyl alcohol. Allyl alcohol can then react with additional PO to form a monofunctional polyether having one hydroxyl group and a terminal allyl ether group. In addition, some of these allyl ether groups can rearrange under certain conditions to form terminal propenyl unsaturation.

These monofunctional polyether impurities are believed to react with polyisocyanates during the preparation of polyurethane foam, terminating the growing polymer chains and therefore limiting the buildup of polymer molecular weight.

In the case of hydroxyl-terminated polymers, each monofunctional molecule contains an unsaturated terminal group, and the presence of these species can be determined by measuring the quantity of the unsaturation. Measurement of this terminal unsaturation can be done by titration with mercuric acetate, as described in "Testing Urethane Foam Polyol Raw Materials", American Society for Testing and Materials, ASTM D-2849-69. In aminating the poly(propylene oxide) polymer, hydrogen often adds across this unsaturation site Nonetheless, the presence of the resulting terminal propyl group is detectable and measurable through techniques such as nuclear magnetic resonance, and the presence of monofunctional species can be determined in this manner.

In this invention, the poly(propylene oxide) polymer is characterized by having up to about 0.04, preferably about 0.001 to about 0.039, more preferably about 0.001 to about 0.030, most preferably about 0.001 to about 0.025, milliequivalent of monofunctional impurities (terminal unsaturation) per gram of polymer.

The poly(propylene oxide) polymer used herein has an equivalent weight of about 1000 to about 5000, preferably about 1300 to about 2500, more preferably about 1500 to about 2000. All equivalent weights herein are calculated by dividing the molecular weight by the nominal number of isocyanate-reactive groups per molecule. Within the preferred and more preferred ranges, the problems associated with monofunctional species content are especially significant in prior art processes. The poly(propylene oxide polymer also advantageously has an average nominal functionality of at least about 2, preferably about 2 to about 6, more preferably about 2 to about 4, most preferably about 2 to about 3. For preparing thermoplastic PUU polymers, a nominal functionality of about 2 is most preferred.

In this invention, the term poly(propylene oxide) polymer refers to a homopolymer of propylene oxide or a copolymer thereof with a copolymerizable alkylene oxide, wherein the polymer contains at least about 50 weight oxypropylene groups. Suitable copolymers of propylene oxide include random and block copolymers thereof with $C_2$–$C_6$ alkylene oxides such as ethylene oxide, 1,2- or 2,3-butylene oxide, the various isomers of hexylene oxide, and the like. Among these other alkylene oxides, ethylene oxide and the isomers of butylene oxide are preferred. Ethylene oxide is particularly preferred due to its reactivity and because it can be used to introduce primary hydroxyl groups to the polymer, thereby increasing its reactivity with a polyisocyanate. When the propylene oxide is copolymerized, it constitutes the major portion of the weight of the alkylene oxides. When the propylene oxide is randomly copolymerized with another alkylene oxide, the propylene oxide preferably constitutes at least about 60, more preferably at least about 70, most preferably at least about 80 percent of the weight of the copolymerized alkylene oxides. Such random copolymers can also have terminal blocks of a different alkylene oxide, particularly ethylene oxide, but such terminal blocks preferably do not constitute more than about 30, more preferably not more than 20 weight percent of the polyether. Among the random copolymers of propylene oxide, 1500–2000 equivalent weight, nominally 2–3 functional copolymers of a mixture of about 80–95 weight percent propylene oxide and 5 to about 20 weight percent ethylene oxide, optionally having terminal poly(ethylene oxide) blocks constituting about 10 to about 20 weight percent of the polyether, are most preferred.

When a block copolymer of poly(propylene oxide) and another alkylene oxide is used, the oxypropylene content thereof is preferably at least about 60 weight percent, more preferably at least about 70 weight percent and most preferably at least about 80 weight percent. The other alkylene oxide used is preferably ethylene oxide, which is most preferably present in the form of terminal poly(oxyethylene) blocks. Among these, the most preferred polyether is a poly(propylene oxide) having an equivalent weight from about 1500 to about 2000 and a nominal functionality from about 2 to about 3, which contains terminal poly(ethylene oxide) blocks constituting about 10 to about 20 weight percent of the polyether.

Homopolymers of propylene oxide are also suitable, particularly those having an equivalent weight from about 1300 to about 2500 and a nominal functionality of 2 to about 3.

Mixtures of these poly(propylene oxide) polymers can be used if desired. When mixtures are used, the mixture advantageously has a level of unsaturation, equivalent weight and functionality as described before. Other relatively high equivalent weight (1000-5000 equivalent weight) polyols may also be used in conjunction with the poly(propylene oxide) polymer, but these are advantageously used minor amounts, preferably less than 25 percent of the total weight of relatively high equivalent weight materials.

The poly(propylene oxide) may contain dispersed polymer particles such as polyurea, polyurethane, or polyurethane-urea particles, as well as particles of a vinyl addition polymer or copolymer such as polystyrene, polyacrylonitrile or polystyrene-co-acrylonitrile particles, or particles of a cured epoxy resin. When such dispersions are used, the equivalent weight and monofunctional species content are calculated for the purposes of this invention on a neat basis, i.e., as though the dispersed polymer particles were absent. Suitable such "polymer polyols" are disclosed, for example, in U.S. Pat. Nos. 4,581,418, 4,460,715, 3,953,393, 4,374,209 and 4,324,716.

The term "nominal functionality" is used herein to designate the number of active hydrogen atoms on the initiator compound used in preparing the poly(propylene oxide) polymer. The poly(propylene oxide) polymer, absent impurities, normally has a number of active hydrogen-containing groups per molecule equal to the number of active hydrogen atoms on the initiator. In the polymerization of alkylene oxides, terminal hydroxyl groups are formed. These hydroxyl-terminated poly(propylene oxide) polymers are useful and generally preferred on the basis of cost and availability.

The poly(propylene oxide) polymer is advantageously prepared in the base-catalyzed polymerization of propylene oxide or mixture thereof with another alkylene oxide in the presence of an initiator compound. The initiator compound is also advantageously of relatively low molecular weight and preferably has a molecular weight from about 17 to about 1000, more preferably about 31 to about 400, more preferably about 31 to about 250. Suitable initiator compounds include water; polyhydroxyl-containing compounds, particularly those free of amine groups, such as ethylene glycol, diethylene glycol, propylene glycol, dipropylene glycol, tripropylene glycol, glycerine, trimethylolpropane, pentaerythritol, sucrose, sorbitol and the like: ammonia, monoethanolamine, diethanolamine, triethanolamine, aminoethylethanolamine, ethylenediamine, diethylenetriamine, low equivalent weight polyethers, and the like. It is highly preferred, however, that the initiator is devoid of amine nitrogen atoms. Hydroxyl-containing initiators containing no amine nitrogen atoms are most preferred, since in the past these initiators have been known to provide especially high monofunctional species contents. The polymers prepared using amine-containing initiators tend to be autocatalytic and their use in preparing molded PUU elastomers has sometimes been found to reduce processing latitude. In addition, the measurement of terminal unsaturation in polyols initiated with amine-containing compounds has been found to be unreliable.

The initiator is contacted with the propylene oxide (and other alkylene oxides, if any) at elevated temperatures in the presence of a basic catalyst. Such processes are described, for example, in U.S. Pat. Nos. 3,393,243 and 4,595,743, incorporated herein by reference. Suitable catalysts include alkali metal hydroxides and alkoxides, alkaline earth carboxylates, certain tertiary amine compounds and the like as described in the foregoing patents. Generally, potassium hydroxide is the catalyst of choice. However, the selection of catalyst and/or reaction conditions does have an effect on the level of monofunctional species formed. Generally, mild conditions, such as the use of temperatures from about 50° to about 120° C. and lower concentrations of catalyst tend to minimize the isomerization of propylene oxide to form monofunctional species. In addition, in some instances the selection of catalyst has been shown to produce lower levels of unsaturated impurities. See, for example, the copending application of Heuvelsland, Ser. No. 273,375, filed Nov. 18, 1988, incorporated herein by reference, wherein the use of barium hydroxide as a catalyst for PO polymerizations is shown to provide products containing low levels of monofunctional species.

In addition, the monofunctional species content of the poly(propylene oxide) polymer can be reduced by hydrolyzing the terminal propenyl unsaturation site, thereby converting some of the monofunctional species to a difunctional species. In this manner, poly(propylene oxide) polymers having monofunctional species contents in excess of 0.04 meq/g can have the monofunctional species contents reduced to the desired level for use in this invention.

Terminal amine groups can be introduced to the polyether by various techniques, such as by a reductive amination with ammonia or a primary amine. Other techniques involve capping the polyether with a diisocyanate and hydrolyzing the free isocyanate groups with water to form the amine. In addition, the polyether can be capped with materials such as o- or p-chloromethylnitrobenzene, and then reduced with hydrogen to form a terminal aromatic amine, as described in U.S. Pat. No. 4,847,416, incorporated herein by reference. Amine-terminated polyethers so prepared can be further reacted with ketones or aldehydes to form terminal imine groups, as described, for example, in U.S. Pat. No. 4,794,129, incorporated herein by reference.

The poly(propylene oxide) is reacted with a polyisocyanate to make an elastomer. Either aliphatic or aromatic polyisocyanates can be used. Suitable aliphatic polyisocyanates include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate, 1,5-diisocyanato-3,3,5-trimethylcyclohexane, 2,4- and/or 2,6-hexahydrotoluene diisocyanate, perhydro-2,4'- and/or -4,4'-diphenylmethanediisocyanate ($H_{12}$MDI), isophorone diisocyanate, and the like.

Suitable aromatic polyisocyanates include, for example, 2,4- and/or 2,6-toluene diisocyanate (TDI), 1,3- and 1,4-phenylene diisocyanate, 4,4'- and/or 2,4'-diphenylmethane diisocyanate (MDI), 1,5-naphthylene diisocyanate, triphenylmethane-4,4',4"-triisocyanate, polyphnylpolymethylene polyisocyanates, mixtures thereof and the like.

In addition, derivatives and prepolymers of the foregoing polyisocyanates such as those containing urethane, carbodiimide, allophanate, isocyanurate, acylated urea, biuret, ester and similar groups are useful herein. Of these, prepolymers of TDI and MDI, and the so-called "liquid MDI" products which contain carbodiimide groups and have an equivalent weight of about 130-150 are of particular significance.

Of the foregoing polyisocyanates, TDI, MDI, isophorone diisocyanate, $H_{12}$MDI, hexamethylene diisocyanate, cyclohexane diisocyanate, their derivatives and mixtures thereof are preferred due to their cost, commercial availability and performance. TDI, MDI and derivatives of MDI are more preferred. MDI and polymeric MDI, and prepolymers and derivatives thereof are especially preferred. Isocyanate-terminated prepolymers as described in U.S. Pat. No. 4,374,210 are of particular interest. In making these latter prepolymers, the use of poly(propylene oxides) with low monofunctional species contents is preferred.

In preparing an elastomer in a one-step process according to the first aspect of the invention, the polyisocyanate is used in an amount sufficient to provide an isocyanate index of about 60-200, preferably about 90-125, more preferably about 95-115. At higher indices, trimerization of the polyisocyanate often occurs, causing the elastomer to lose flexibility. At lower indices, insufficient curing occurs, causing the elastomer to have poor properties. The "isocyanate index" is 100 times the ratio of isocyanate groups to isocyanate-reactive groups contained in the composition which reacts with the polyisocyanate to form the elastomer.

In preparing a prepolymer or quasi-prepolymer for use according to the second aspect of this invention, a substantial excess of the polyisocyanate is reacted with a composition including a 1000-5000 equivalent weight poly(propylene oxide) polymer to form an isocyanate-terminated prepolymer or quasi-prepolymer. In forming the prepolymer, at least 75, preferably at least 95 percent by weight of the 1000-5000 equivalent weight isocyanate-reactive materials used in the prepolymer formation is one or more low monol-containing poly(propylene oxide) polymers. If a different 1000-5000 equivalent weight isocyanate-reactive material is used in addition to the poly(propylene oxide) polymer, it is a material other than a poly(propylene oxide) polymer, such as a polyester, a polyether containing greater than 50 percent by weight of repeating units other than oxypropylene, or some other material. Other isocyanate-reactive materials, such as chain extenders and cross-linkers as described hereinafter, can also be used in prepolymer or quasi-prepolymer formation.

In the second aspect of this invention, the prepolymer or quasi-prepolymer prepared according to the foregoing paragraph is reacted with another isocyanate-reactive composition (B-side) to form an elastomer. The B-side may or may not also contain a 1000-5000 equivalent weight isocyanate-reactive material. In "two-step" processes, the B-side usually contains no such 1000-5000 equivalent weight material, or only a small quantity thereof, compared to the weight of 1000-5000 equivalent weight materials used in making the prepolymer. Thus, a "two-step" process, as that term is used herein, refers to a process wherein the B-side composition contains less weight of 1000-5000 equivalent weight materials than are used in making the prepolymer or quasi-prepolymer. The two-step processes are typical of cast elastomer processes.

In the second aspect of the invention, it is also possible that the B-side contains a substantial quantity of 1000-5000 equivalent weight isocyanate-reactive materials. For example, when a prepolymer or quasi-prepolymer is used, from about 30 to about 85, preferably about 45 to about 80 weight percent of all 1000-5000 isocyanate-reactive materials can be present in the B-side composition. Such processes are considered to be "one-step" processes for the purposes of this invention.

Thus, the low monofunctional poly(propylene oxide) polymer can be used in several ways according to this invention in order to obtain improved processing or improved physical properties in the ultimate PUU elastomer. In a one-step processes not involving a prepolymer or quasi-prepolymer, as mentioned before, the poly(propylene oxide) polymer is used as a component of the B-side active hydrogen composition. In a one-step process involving a prepolymer or quasi-prepolymer, the low monofunctional species content poly(propylene oxide) polymer can be used in making the prepolymer or quasiprepolymer, in the B-side composition, or both. In a two-step process, the low monofunctional content poly(propylene oxide) polymer is used in making the prepolymer or quasi-prepolymer, or in both the prepolymer or quasi-prepolymer and the B-side composition.

Of particular interest in reaction injection molding (RIM) applications are quasi-prepolymers prepared by reacting diphenylmethanediisocyanate (MDI) or a liquid MDI with a low monofunctional content polyether containing from about 50 to about 100, preferably about 80 to 100, weight percent oxypropylene units derived from propylene oxide, a nominal functionality of about 2 to about 3 and an equivalent weight of from about 1300 to about 2500, more preferably about 1500 to about 2000. Such quasi-prepolymer advantageously has an NCO content of about 6 to about 25, preferably about 8 to about 20, more preferably about 14 to about 20 percent by weight. In preparing the quasi-prepolymer, low equivalent weight isocyanate-reactive materials may be used in addition to the polyether, such as dipropylene glycol, tripropylene glycol and other similar materials, as taught in U.S. Pat. No. 4,374,210.

A catalyst for the reaction of the poly(propylene oxide) polymer and the polyisocyanate is also advantageously used in making elastomers according to this invention. However, when the poly(propylene oxide) is amine-terminated, a catalyst may not be necessary and it is sometimes preferred to omit it. Although a wide variety of materials are known to be useful for this purpose, the most widely used and preferred catalysts are the tertiary amine catalysts and the organometallic catalysts.

Exemplary tertiary amine catalysts, include, for example, triethylenediamine, N-methyl morpholine, N-ethyl morpholine, diethyl ethanolamine, N-coco morpholine, 1-methyl-4-dimethylaminoethyl piperazine, 3-methoxy-N-dimethylpropylamine, N,N-diethyl-3-diethylaminopropylamine, dimethylbenzyl amine, bis(2-dimethylaminoethyl)ether, and the like. Tertiary amine catalysts are advantageously employed in an amount from about 0.01 to about 5, preferably about 0.05 to about 2 parts per 100 parts by weight of the poly(propylene oxide) polymer.

Exemplary organometallic catalysts include organic salts of metals such as tin, bismuth, iron, mercury, zinc, lead and the like, with the organotin compounds being preferred. Suitable organotin catalysts include dimethyltindilaurate, dibutyltindilaurate, stannous octoate and the like. Other suitable catalysts are taught, for example, in U.S. Pat. No. 2,846,408. Advantageously, about 0.001 to about 0.5 part by weight of an organometallic catalyst is used per 100 parts of propylene oxide polymer.

The reaction mixture may contain additional components such as chain extenders, crosslinkers, catalysts, surfactants, colorants, cell openers, flame retardants, antioxidants, mold release agents, UV stabilizers and the like, which may vary according to the desired attributes of the elastomer.

It is highly preferred to employ a chain extender in preparing the elastomer of this invention. "Chain extenders", for the purposes of this invention, are compounds having two active hydrogen-containing groups per molecule and an equivalent weight from about 31 to about 300, preferably about 31 to about 150. Hydroxyl-containing chain extenders include the alkylene glycols and glycol ethers such as ethylene glycol, 1,3 -propylene glycol, 1,4-butylene glycol, 1,6-hexamethylene glycol, diethylene glycol, triethylene glycol, dipropylene glycol, tripropylene glycol, 1,4-cyclohexanedimethanol, alkoxylated aniline and the like. Amine chain extenders include diethyltoluene diamine, phenylene diamine, methylene bis(o-chloroaniline), NaCl-blocked methylene bis(aniline), toluene diamine, stearically hindered aromatic diamines which are substituted at at least one of the carbon atoms adjacent to each amine group with a lower alkyl group, and the like. In reaction injection molding formulations, the stearically hindered aromatic diamines, especially those containing a lower alkyl group on at least once carbon atom adjacent to each of the amine groups, are preferred. In casting operations, less reactive chain extenders including methylene bis(o-chloroaniline) and NaCl-blocked methylene bis(aniline) are preferred.

The amount of chain extender used varies substantially with the desired properties of the elastomer. In general, increasing the quantity of chain extender causes increases in tensile strength, hardness and stiffness of the elastomer. Thus, for preparing soft, highly flexible polymers, relatively low quantities of chain extender are used, whereas when a stiffer, harder elastomer is desired, greater quantities of chain extender are used. In general, the amount of chain extender advantageously ranges from about 2 to about 85, preferably about 5 to about 70, more preferably about 10 to about 40 parts by weight per 100 parts by weight of the 1000–5000 equivalent weight materials.

Crosslinkers may also be used, but are usually less preferred. Suitable such crosslinkers include alkanolamines and other compounds of about 300 or lower equivalent weight having about 3–8, preferably about 3–4 active hydrogen-containing groups per molecule. Exemplary such compounds are glycerine and trimethylolpropane, alkoxylated derivatives thereof, as well as other alkylene triols. Preferred, however, are alkanolamines such as diethanolamine, triisopropanolamine, triethanolamine, diisopropanolamine, adducts of 4–8 moles of ethylene oxide and/or propylene oxide with alkylene polyamines such as ethylene diamine and the like, and polyamines such as methylene bis(o-chloroaniline), ethylenediamine, ammonia and the like. Most preferred, on the basis of its optimum reactivity, is diethanolamine.

It is often preferred, especially in RIM processes, to use an internal mold release agent to facilitate the rapid removal of the molded part for the mold. Although any internal mold release that is effective may be used, the mold release of choice is a metallic salt of certain carboxylic acids in conjunction with a primary, secondary or tertiary amine-containing compound, as taught in EPA 119,471, U.S. Pat. No. 4,876,019 and U S. Pat. No. 4,585,803, all incorporated herein by reference. Particularly preferred internal mold release agents are zinc salts of fatty acids such as zinc stearate and zinc laurate in conjunction with diethyltoluene diamine and/or an amine-terminated polyether.

A blowing agent may be used if desired to reduce the density of the elastomer. The blowing agent is any material which is capable of generating a gas under the conditions of the reaction of a polyisocyanate and the poly(propylene oxide) polymer. Such materials include air, carbon dioxide, nitrogen, water, formic acid, low-boiling halogenated alkanes, finely divided solids, the so-called "azo" blowing agents such as azobis(formamide) and the like. Preferred are water, the low-boiling halogenated alkanes, or mixtures thereof. Blowing agents are advantageously employed in a quantity sufficient to provide the elastomer with a bulk density from about 0.5, preferably about 0.8 up about 1.2 g/cc.

When blowing agents are used, it is usually advantageous to employ a small quantity of a surfactant to stabilize the cells in the reaction mixture until it has sufficiently cured to maintain its cellular configuration. Polysiloxane/poly(alkylene oxide) block copolymers and certain fatty acid salts are useful for the purpose.

In preparing elastomers according to this invention, any convenient method for mixing the reactants and dispensing them into a mold may be used. However, the two predominant commercial processes are casting and reaction injection molding processes.

In the casting process, the reaction mixture is commonly less reactive than that used in RIM processes, due to the use of less reactive raw materials and/or the use of two-step polymer production involving the formation of a prepolymer in a first step. In casting, it is preferred to form a prepolymer by reacting most or all of the poly(propylene oxide) polymer with an excess of polyisocyanate to form an isocyanate-terminated intermediate containing about 0.25 to about 30, preferably about 0.5 to about 25, more preferably about 1 to about 15 weight percent isocyanate groups. This prepolymer is then reacted in a second step with a chain extender and any remaining poly(propylene oxide) polymer to form the molded polymer. In the reaction with the prepolymer and the chain extender, an isocyanate index of about 90 to about 125 is preferred, and of about 100 to about 115 is more preferred. Suitable casting techniques are described in U.S. Pat. No. 4,689,356, incorporated herein by reference.

In the reaction injection molding process, more highly reactive materials can be processed. Thus, this process is generally used when the poly(propylene oxide) polymer is terminated in primary hydroxyl, amine or imine groups, highly reactive chain extenders are used, and when a one-shot process is desired. Reaction injection molding processes are also favored in the production of large parts, i.e., those weighing over one pound. In the reaction injection molding process, the reactants are impingement mixed under high pressure and immediately transferred to a mold where initial curing takes place. Demolding in reaction injection molding processes is typically done within about 10 seconds to about 3 minutes, preferably about 15 seconds to one minute, more preferably about 15 to about 45 seconds after the mold is filled. After demolding, post-curing is often performed on the molded part in order to further develop the physical properties. Suitable RIM techniques are described, for example, in U.S. Pat. Nos. 4,297,444 and 4,218,543, incorporated herein by reference.

In one-shot processes, the B-side composition contains a 1000–5000 equivalent weight isocyanate-reactive material, and preferably a chain extender. When a quasi-prepolymer is used according to the second aspect of the invention, the 1000–5000 equivalent weight material in the B-side composition does not have to include a low monofunctional species poly(propylene oxide) polymer. However, such is preferred. Also, in the one-shot system according to the first aspect of the invention, at least a major amount of the 1000–5000 equivalent weight material is such a low monofunctional species poly(propylene oxide) polymer.

In RIM applications, several types of B-side compositions are preferred. A system typically used in making lower flexural modulus elastomers is a mixture of a hydroxyl-terminated, nominally di- or trifunctional poly(propylene oxide) polymer of 1300 to 2500 equivalent weight having terminal ethylene oxide capping constituting up to about 20 weight percent of the weight of the poly(propylene oxide) and diethyltoluenediamine or other sterically hindered aromatic diamine chain extender. A second system for similar utility, but having some improved flexural and thermal properties additionally contains up to equal quantities, based on weight of hydroxyl-terminated poly(propylene oxide) polymer, of a nominally di- or trifunctional animated polyether of about 150 to about 6000 molecular weight. A third system useful for preparing higher modulus and/or higher heat distortion elastomers comprises a mixture of an amine and/or imine-terminated, nominally di- or trifunctional poly(propylene oxide) polymer of 1300 to 2500 equivalent weight and diethyltoluenediamine or other sterically hindered aromatic diamine chain extender. When used according to the first aspect of the invention, the 1000–5000 equivalent weight poly(propylene oxide) polymer will of course have the required low monofunctional species contents. When used with a quasi-prepolymer according to the second aspect, such 1000–5000 equivalent weight material preferably have such low monofunctional species contents.

Any of the three systems described in the preceding paragraph preferably contains an internal mold release package as described in U.S. Pat. No. 4,876,019 or 4,585,803. Such internal mold release package preferably comprises a zinc salt of a $C_{12-20}$ carboxylic acid and in the first system either an aminated polyether or an amine-initiated polyether of about 800 or lower molecular weight. The most preferred systems contain about 0.25 to about 5 weight percent of zinc stearate or zinc laurate and about 5 to about 70 weight percent diethyltoluenediamine, based on weight of polyether(s). Those systems, with or without the mold release package, are most preferably reacted with a liquid MDI or an MDI quasi-prepolymer containing about 8 to about 30 percent NCO groups.

The elastomer made in accordance with this invention is useful, for example, in dynamic applications such as belts, tow truck tires and the like, as well as in static applications such as beer keg skirts, automotive fascia and body panels, and the like. In general, the elastomer of this invention is useful for similar applications as conventional PUU elastomers.

The elastomers prepared according to this invention have certain properties which render them particularly useful in certain applications. In high temperature dynamic applications, this elastomer exhibits improved life in terms of time of use before failure. In addition, RIM elastomers prepared in accordance with this invention in some instances show improved heat sags and reduced numbers of surface sinks as compared to conventional elastomers. Because it is possible to obtain adequate reactivity with hydroxyl-terminated poly(propylene oxide) polymers with lower oxyethylene content, the resulting elastomer in such cases exhibits reduced moisture sensitivity.

The following examples are provided to illustrate the invention, but are not intended to limit the scope thereof. All parts and percentages are by weight unless otherwise indicated.

EXAMPLE 1

A polyurethane-urea elastomer is prepared from the formulation set out in Table 1 following. The formulation is processed on a reaction injection molding machine with a full-scale automotive bumper mold, using conditions as specified in Table 1. Polyol A has 0.065 meq/g of monofunctional species, as measured by mercuric acetate titration of the unsaturation sites. This elastomer is referred to herein as Comparative Sample A. The demold time for Comparative Sample A is chosen as 40 seconds, as that demold time is known from experience to be as short as commercially feasible given the parameters and mold used in this experiment.

TABLE 1

| Component | Parts by Weight |
|---|---|
| B-side | |
| Polyol A[1] | 96 |
| Aminated polyglycol[2] | 4 |
| Zinc Stearate | 2.5 |
| Propoxylated EDA[3] | 1 |
| DETDA[4] | 29 |
| organotin catalyst | 0.10 |
| TEDA solution[5] | 0.10 |
| Silicone surfactant | 1 |
| 1/16" milled glass | 67 |
| A-side | |
| MDI prepolymer[6] | 103 index |
| Processing Conditions | |
| B-side temperature | 99° F. |
| A-side temperature | 101° F. |
| Mold Temperature | 155° F. |
| Throughput | 330 lb/min |
| Demold Time | 40 sec |

[1] A 5000 molecular weight, glycerine-initiated poly(propylene oxide) having a 20% terminal poly(ethylene oxide) cap and 0.065 meq/g monols.
[2] A 400 molecular weight propylene glycol-initiated poly (oxypropylene) diamine.
[3] An adduct of 5 moles of PO and 1 mole of ethylene diamine.
[4] Isomeric mixture of diethyltoluene diamine.
[5] A 33% solution of triethylene diamine.
[6] A 233 equivalent weight MDI prepolymer.

Elastomer Sample No. 1 is prepared in like manner, except Polyol A is replaced with a like polyol having only 0.040 meq/g monofunctional species (Polyol B). This sample is repeated, each time reducing the demold time, until its green strength is subjectively determined to be equivalent to that of Comparative Sample A. The green strength of Elastomer Sample No. 1 at 25 seconds demold time is found to be equivalent to that of Comparative Sample A at 40 seconds demold time. Thus, Elastomer Sample No. 1 cures substantially more rapidly than Comparative Sample A to a demoldable state.

To determine the effect of using Polyol B on processing latitude, duplicate samples of Comparative Sample A and Sample No. 1 are prepared, each time decreasing the throughput of reactants into the mold. By decreasing throughput, it takes longer to fill the mold. Thus, as throughput is decreased, it becomes more likely that premature gelation of the reaction mixture will occur. This is evidenced in the molded part by the presence of flow lines, pores and pregel area. Evidence of premature gelation for both Comparative Sample A and Sample No. 1 appears when the throughput reaches 275 lb/min. Thus, even though the use of Polyol B provides a shorter demold time, it does not reduce the time until initial gelation occurs. Thus, this invention provides the molder with an equivalent time in which to mix the components and fill the mold, yet still provides faster curing, as compared to the Comparative Sample.

As a further comparison, Comparative Sample A is repeated, except that the amount of organotin catalyst is increased to reduce the demold time to equal that of Sample No. 1 (25 seconds). The elastomer so prepared exhibits pores and pregel areas, even at 330 lb/min throughput. Thus, unlike this invention, increasing the catalyst shortens the demold time at the expense of decreased processing latitude and the appearance of pregels and other indications of premature gelation.

The foregoing evaluation of Sample No. 1 and Comparative Sample A is consistent with the results obtained when a probe test is conducted on the reacting systems. The probe test is described in "Rheological Analysis of Modulus Growth: A Probe for Determining the Strength of Reacting Urethane Systems", D. J. Burchell and J. P. Porter, 37th *Annual Polyurethanes Technical Marketing Conference*, Oct. 1989, p. 144. The probe test reveals that in Sample No. 1 there is a more rapid buildup of a three-dimensional network as Sample No. 1 reacts, as compared with Comparative Sample A.

EXAMPLE 2

Polyurea RIM elastomers are being examined for use in automotive body panel applications because compared to similar polyurethane-urea elastomers the polyurea elastomers tend to be more rigid, have shorter demold times and have better high temperature properties as measured by heat sag tests. In this example, the performance of PUU elastomers prepared according to this invention is compared with that of a conventional polyurea RIM elastomer.

A polyurea RIM elastomer is prepared by reacting an MDI prepolymer (as in Example 1) with a mixture of 70.5 parts of a 5000 molecular weight primary aliphatic amine-terminated, glycerine-initiated poly(propylene oxide), 29.5 parts diethyltoluene diamine and 0.2 part dimethyltindilaurate. This amine-terminated poly(propylene oxide) contains in excess of 0.05 meq/g of monofunctional species. The reaction mixture is processed at a 100 index, with the B-side temperature at 145° F., the A-side temperature at 125° F. and the mold temperature initially at 240° F. This mold temperature is chosen so that a demold time of thirty seconds is obtained. The mold is a 10"×18"×1/3"plaque. The resulting elastomer is referred to herein as Comparative Sample B.

Comparative Sample C. is prepared in like manner, except the amine-terminated polyether is replaced with a 5000 molecular weight glycerine-initiated poly(propylene oxide) polyol containing about 14 percent ethylene oxide capping. This polyol contains about 0.065 meq/q of monofunctional species.

Sample No. 2 is prepared like Comparative Sample B, except the amine-terminated polyether is replaced with a 5000 molecular weight glycerineinitiated poly(propylene oxide) polyol containing about 14 percent ethylene oxide capping and about 0.03 meq/g of monofunctional species.

Comparative Sample D is prepared like Comparative Sample B, except the amine-terminated polyether is replaced with a 6000 molecular weight glycerine-initiated poly(propylene oxide) polyol containing about 18 percent ethylene oxide capping. This polyol contains about 0.09 meq/q of monofunctional species.

Sample No. 3 is prepared like Comparative Sample B, except the amine-terminated polyether is replaced with a 6000 molecular weight glycerineinitiated poly(propylene oxide) polyol containing about 18 percent ethylene oxide capping and about 0.03 meq/g monofunctional species.

The density, flexural modulus and notched Izod impact strength of each of Comparative Samples B-D and Sample Nos. 2 and 3 are measured and are as reported in Table 2 following. In addition, duplicate runs of each are made, each time lowering the mold temperature until the part can no longer be demolded in thirty seconds. The minimum temperature at which a 30 second demold with suitable green strength is obtained is reported in Table 2.

TABLE 2

| Property | Sample or Comparative Sample No. | | | | |
|---|---|---|---|---|---|
| | B* | C* | 2 | D* | 3 |
| Density, g/cc | 1.12 | 1.13 | 1.14 | 1.13 | 1.13 |
| Flexural Modulus[1] | | | | | |
| −20° F. | 141,000 | 159,000 | 171,000 | 146,000 | 153,000 |
| room temperature | 87,000 | 86,000 | 86,000 | 74,000 | N.D. |
| Notched Izod[2] | | | | | |
| −20° F. | 4.9 | 2.7 | 1.6 | 4.1 | 6.0 |
| room temperature | 9.5 | 10.8 | 9.5 | 8.0 | 9.1 |
| Heat Sag[3] | 1.24 | 1.60 | 1.19 | 1.79 | 1.28 |
| Minimum Mold Temp.[4] | 240° F. | 240° F. | 200° F. | 220° F. | 160° F. |

*Not an example of this invention. N.D. is not determined.
[1]ASTM D-790. Reported in psi.
[2]ASTM D-256. Reported in in-lbs.
[3]At 375° F. for 30 minutes with a 6" overhang. Reported in mm.
[4]Minimum mold temperature to obtain adequate green strength at 30 second demold.

It is seen from the data in Table 2 that the elastomers prepared according to this invention have properties very similar to that of the polyurea elastomer (Comparative Sample B). This is considered very surprising, since polyurea elastomers are recognized in the art as having thermal and flexural properties superior to those of polyurethane-urea elastomers. In addition, the present invention achieves curing and green strength at demold equivalent to that of the polyurea elastomer, even though a substantially reduced mold temperature is used.

EXAMPLE 3

Elastomer sample No. 4 is prepared from a polyurethane prepolymer which is chain extended with an NaCl-blocked 4,4'-methylenebis(aniline) (Caytur 21, sold by Uniroyal Chemicals, Inc.). The prepolymer is made by reacting a pure MDI mixture (98percent 4,4'-isomer) with a mixture of 57.7 percent of Triol A and 42.3 percent Diol A. Triol A is a 1600 equivalent weight, glycerine-initiated, nominally trifunctional poly(propylene oxide) which is end-capped with 14.5 percent by weight oxyethylene units. It contains 0.03 meq/g monofunctional species, as measured by mercuric acetate titration of terminal unsaturation. Diol A is a 1000 equivalent weight, propylene glycol initiated, nominally difunctional poly(propylene oxide). It contains 0.033 meq/g monofunctional species. The mixture of Triol A and Diol A contains 0.032 meq/g monofunctional species.

The reaction of the prepolymer and MDI is conducted by heating the MDI to 80° C., adding the Triol/Diol mixture with agitation, and heating the resulting combination for one hour at 80° C. The proportions of MDI and Triol/Diol mixture are such that the percent NCO of the final product is about 6.75–7.08 percent.

The prepolymer is degassed under vacuum and mixed with the chain extender at a 100 index, cast into a 10.5×7.5×0.07" mold which is preheated to 150° C., and cured for one hour at 150° C. The resulting elastomer (Sample No. 4) is then subjected to physical property evaluation, with results as indicated in Table 3 following.

Comparative Sample E is made in like manner, except Triol B is used in place of Triol A. Triol B is like Triol A in all respects, except its monofunctional species content is 0.075 meq/g. The mixture of Triol B and Diol A contains 0.056 meq/g monofunctional species. The physical properties of Comparative Sample E are as reported in Table 3.

TABLE 3

| Property | Sample or Comparative | |
|---|---|---|
| | 4 | E* |
| Monol content[1], meq/g | 0.032 | 0.056 |
| Tensile strength[2], psi | 1879 | 1453 |
| Elongation[2], % | 392 | 331 |
| Flexural Modulus[2], psi | 12,405 | 13,809 |
| Split Tear Str.[3], pli | 87 | 75 |
| Die C Tear Str.[3], pli | 263 | 250 |
| Shore A Hardness*[4] | 91 | 91 |

*Not an example of this invention.
[1]Average monol conent of the Triol/Diol blend.
[2]ASTM D-790.
[3]ASTM D-624-86.
[4]ASTM D-2240-86.

As can be seen from the data in Table 3, with decreasing monol content are obtained significant improvements in tensile strength, elongation and tear strength, without sacrifice of other properties and at equivalent hardness.

EXAMPLE 4

Two prepolymers are prepared by reacting 46.5 parts pure MDI (98 percent 4,4'- isomer), 43.5 percent of a polyol, and 10 percent of a 143 equivalent weight "liquid" MDI. In the first prepolymer (Prepolymer A) the polyol is a 1660 equivalent weight, glycerineinitiated, nominally trifunctional poly(propylene oxide) containing 0.080 meq/g monofunctional species. In the second prepolymer (Prepolymer B) a polyol is used which differs only in that the monol content is 0.022 meq/g.

Four reaction injection molded elastomers are prepared using one of these prepolymers and a B-side formulation containing 56.3 parts polyol, 3.5 parts of a 200 equivalent weight, primary amine terminated, propylene glycol-initiated poly(propylene oxide), 2.2 parts zinc stearate, 0.9 part of an adduct of 5 moles propylene oxide and one mole of ethylene diamine, 36 parts of an isomeric mixture of 2,4- and 2,6-diethyltoluenediamine, 0.1 part of an organotin catalyst, 0.1 part of a triethylenediamine solution and 1 part of a silicone surfactant. The isocyanate index is 103. The elastomers are prepared on a Cincinnati Milacron HT RIM machine and injected into a 20.5×24.5×0.125" steel mold. Component temperatures are about 105° F., mold temperature is about 155° F., the injection rate is 2.5 lb/sec, injection pressures are about 1850 psi and the demold time is 30 seconds.

In Comparative Sample F, Prepolymer A is used, and the B-side polyol is a 1660 equivalent weight, glycerine-initiated poly(propylene oxide) which is end-capped with 17.5 percent ethylene oxide and which contains 0.065 meq/g monofunctional species.

In Sample 5, the same B-side polyol is used, but Prepolymer B replaces Prepolymer A.

Sample 6 is the same as Comparative Sample F, except the B-side polyol is replaced with a polyol which is the same in all respects except the monofunctional species content is only 0.028 meq/g. Sample 7 is the same as Sample 6, except Prepolymer B is used.

Thus, Comparative Sample F employs a high monol polyol on both the A-side and B-side. Sample 5 employs a low monol polyol in the A-side prepolymer, Sample 6 employs a low monol polyol in the B-side only, and Sample 7 employs the use of low monol polyols in both the prepolymer and B-side.

The results of physical property testing are reported in Table 4.

TABLE 4

| | Sample or Comparative Sample No. | | | |
|---|---|---|---|---|
| | F* | 5 | 6 | 7 |
| Density, gm/cc | 1.09 | 1.10 | 1.09 | 1.09 |
| Flexural Modulus[1], psi | 48,822 | 53,400 | 53,150 | 49,200 |
| Flexural Modulus ratio[1] | 2.65 | 2.15 | 2.09 | 2.06 |
| Tensile Strength[1], psi | 4145 | 4070 | 3949 | 4225 |
| % Elongation[1] | 240 | 220 | 225 | 220 |
| Tear Strength[2], pli | 605 | 615 | 610 | 620 |
| Heat Sag[3], mm | 22 | 15 | 16 | 12 |
| Impact Resistance[4], lbs | 828 | 820 | 863 | 892 |

*Not an example of this invention.
[1]ASTM D-790. Reported in psi. Flexural modulus ratio is the ratio of the flexural modulus at −20° F. to that at 158° F. Low values are superior.
[2]ASTM D-624.
[3]At 250° F. for 60 minutes with a 6" overhang. Reported in mm.
[4]ASTM D-3763. Break force is reported.

As can be seen from the data in Table 4, the tensile, tear, elongation and room temperature flexural modulus of Comparative Sample F and Samples 5–7 are relatively constant. However, each of Samples 5–7 shows a marked improvement in heat sag and flexural modulus ratio. This is particularly surprising for Sample No. 5, since the only change is the use of a low monol polyol in the prepolymer, and a high monol polyol is still present in the B-side. In addition, Samples 6 and 7 show a substantial improvement in impact strength. All of Samples 5–7 subjectively have better green strength than Comparative Sample F, with Sample 7 being best.

An examination of Comparative Sample F shows that about 15–25 percent of its surface exhibits surface sinks, i.e., areas of slight depression. Each of Samples 5–7 show significantly fewer surface sinks. Sample No. 6 contains surface sinks over less than about 2 percent of its surface. Thus, about 90 percent of the surface sinks are eliminated with the use of low monofunctional species poly(propylene oxide) polymers. As a result, when painted, the Samples of this invention exhibit a markedly better appearance than Comparative Sample F.

EXAMPLE 5

In this example, Prepolymers A and B from the foregoing example are used in making polyurea RIM elastomers by reaction with an isocyanate-reactive composition containing 75 parts by weight of a 5000 molecular weight, glycerine-initiated, primary amine-terminated poly(propylene oxide), 25 parts of an isomeric DETDA mixture and 1 part of a silicone surfactant. In Comparative Sample G, Prepolymer A (made from high monol polyol) is used, and the amine-terminated poly(propylene oxide) contains in excess of 0.05 meq/g of monofunctional impurities. In Sample 8, Prepolymer B (made from low monol polyol) is used, and the amine-terminated poly(propylene oxide) contains only 0.028 meq/g of monofunctional impurities.

For both Comparative Sample G and Sample No. 8, an Admiral Model 2.2V/2750 RIM machine is used, component temperatures are 26°–30° C., the mold temperature is 68° C., the injection rate is 1.1 lb/sec and the demold time is 20 seconds. The isocyanate index is 1.03. Before determining physical properties, the polymers are postcured at 250° F. for one hour. The mold has dimensions of $10 \times 18 \times 0.09''$.

Comparative Sample G has a specific gravity of 1.08 g/cc, a flexural modulus of about 24,400 psi, a tensile strength of 3230 psi, 290 percent elongation and a heat sag of 41 mm (determined by heating at 250° F. for 60 minutes with a six-inch overhang). Sample No. 8 has a specific gravity of 1.07, a flexural modulus of about 25,500 psi, a tensile strength of 4092 psi, 264 percent elongation and a heat sag of 27 mm. Sample No. 8 is therefore seen to exhibit significantly improved tensile strength and heat sag, with other properties remaining more or less constant.

What is claimed is:

1. A process for preparing a polyurethane and/or polyurea elastomer wherein a polyisocyanate is reacted with an isocyanate-reactive composition including a 1000–5000 equivalent weight material, wherein at least the major portion of the 1000–5000 equivalent weight material is a poly(propylene oxide) polymer nominally having at least two isocyanate-reactive groups per molecule or mixture thereof, said poly(propylene oxide) polymer or mixture thereof having about 0.04 milliequivalent per gram (meq/g) or less of monofunctional impurities.

2. The process of claim 1 wherein the poly(propylene oxide) polymer is the reaction product of propylene oxide or a mixture of propylene oxide and at least one other alkylene oxide in the presence of an initiator compound which is devoid of amine nitrogen atoms.

3. The process of claim 2 wherein the isocyanate-reactive composition further comprises a chain extender.

4. The process of claim 3 wherein the chain extender is an aromatic diamine.

5. The process of claim 4 wherein the poly(propylene oxide) polymer is a polymer of propylene oxide which is end-capped with up to 20 weight percent ethylene oxide, has a nominal functionality from about 2 to about 3 and has an equivalent weight from about 1300 to about 2500.

6. The process of claim 5 which is a reaction injection molding process.

7. The process of claim 6 wherein the elastomer has a density of at least about 0.8 g/cc.

8. The process of claim 7 wherein the aromatic diamine is diethyltoluene diamine.

9. The process of claim 4 which is a casting process.

10. A process wherein an isocyanate-terminated prepolymer or quasi-prepolymer is reacted with an isocyanate-reactive composition to form a polyurethane and/or polyurea elastomer, wherein (1) said prepolymer or quasi-prepolymer is the reaction product of an excess of a polyisocyanate and a composition containing a 1000–5000 equivalent weight isocyanate-reactive material or mixture thereof, wherein at least the major portion of said 1000–5000 equivalent weight isocyanate-reactive material is a poly(propylene oxide) polymer nominally having at least two isocyanate- reactive groups per molecule or mixture thereof, said poly(propylene oxide) polymer or mixture thereof having about 0.04 meq/g or less of monofunctional impurities: and (2) said poly(propylene oxide) polymer or mixture thereof constitutes at least about 15 percent of the combined weight of all 1000–5000 equivalent weight isocyanate-reactive materials employed in preparing said prepolymer or quasi-prepolymer and in the isocyanate-reactive composition with which said prepolymer or quasi-prepolymer is reacted.

11. The process of claim 10 wherein said isocyanate-reactive composition comprises a chain extender.

12. The process of claim 11 wherein said prepolymer contains from about 0.5 to about 25 weight percent NCO groups.

13. The process of claim 12 wherein the chain extender is methylene bis(o-chloroaniline).

14. The process of claim 13 wherein the isocyanate-reactive composition is substantially devoid of a 1000–5000 equivalent weight isocyanate-reactive material.

15. The process of claim 11 wherein said prepolymer or quasi-prepolymer is an MDI quasi-prepolymer having an NCO content of about 8 to 20 percent by weight.

16. The process of claim 15 wherein said isocyanate-reactive composition is selected from the group consisting of: (1) a mixture of a hydroxyl-terminated, nominally di- or trifunctional poly(propylene oxide) polymer of 1300 to 2500 equivalent weight having terminal ethylene oxide capping constituting up to about 20 weight percent of the weight of the poly(propylene oxide) and diethyltoluenediamine or other sterically hindered aromatic diamine chain extender: (2) a mixture of a hydroxyl-terminated, nominally di- or trifunctional poly(propylene oxide) polymer of 1300 to 2500 equivalent weight having terminal ethylene oxide capping constituting up to about 20 weight percent of the weight of the poly(propylene oxide), up to equal quantities, based on weight of hydroxyl-terminated poly(propylene oxide) polymer, of a nominally di- or trifunctional animated polyether of about 150 to about 6000 molecular weight, and diethyltoluenediamine or other sterically hindered aromatic diamine chain extender, and (3) a mixture of an amine and/or imine-terminated, nominally di- or trifunctional poly(propylene oxide) polymer of 1300 to 2500 equivalent weight and diethyltoluenediamine or other sterically hindered aromatic diamine chain extender.

17. The process of claim 16 wherein any poly(propylene oxide) polymer in the isocyanate-reactive composition contains 0.04 meq/g or less of monofunctional impurities.

18. A polyurethane or polyurea elastomer prepared according to the process of claim 1.

19. A polyurethane or polyurea elastomer prepared according to the process of claim 6.

20. A polyurethane or polyurea elastomer prepared according to the process of claim 8.

21. A polyurethane or polyurea elastomer prepared according to the process of claim 10.

22. A polyurethane or polyurea elastomer prepared according to the process of claim 16.

23. A polyurethane or polyurea elastomer prepared according to the process of claim 17.

24. The process of claim 5 wherein the isocyanate-reactive groups of said poly(propylene oxide) polymer comprise amine and/or imine groups.

25. The process of claim 4 which is a reaction injection molding process.

26. The process of claim 10 which is a reaction injection molding process.

* * * * *

UNITED STATES PATENT AND TRADEMARK OFFICE
CERTIFICATE OF CORRECTION

PATENT NO. : 5,106,874
DATED : April 21, 1992
INVENTOR(S) : James R. Porter; Robert B. Turner, both of Lake Jackson, Texas It is certified that error appears in the above-identified patent and that said Letters Patent is hereby corrected as shown below:

Title Page, Other Publications, Third reference, Title should read as follows: "The Effect of Monohydroxy Polyether Polyols on the Processing, Reactivity, and Physical Properties Performance of Flexible Slabstock Foam System"

Column 18, line 21, delete " impurities: " and insert -- impurities: --.

Column 18, line 53, delete " extender: " and insert -- extender; --.

Signed and Sealed this

Twenty-sixth Day of October, 1993

Attest:

BRUCE LEHMAN

*Attesting Officer*  *Commissioner of Patents and Trademarks*